(12) United States Patent
Doshi et al.

(10) Patent No.: US 12,348,618 B2
(45) Date of Patent: Jul. 1, 2025

(54) DECENTRALIZED KEY GENERATION AND MANAGEMENT

(71) Applicant: Intel Corporation, Santa Clara, CA (US)

(72) Inventors: Kshitij Arun Doshi, Tempe, AZ (US); Francesc Guim Bernat, Barcelona (ES); Srikathyayani Srikanteswara, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 17/358,474

(22) Filed: Jun. 25, 2021

(65) Prior Publication Data
US 2021/0328783 A1    Oct. 21, 2021

(51) Int. Cl.
*H04L 9/08*        (2006.01)
(52) U.S. Cl.
CPC .......... *H04L 9/0847* (2013.01); *H04L 9/0825* (2013.01); *H04L 9/0861* (2013.01)
(58) Field of Classification Search
CPC ... H04L 9/0847; H04L 9/0825; H04L 9/0861; H04L 9/08
See application file for complete search history.

(56) References Cited

U.S. PATENT DOCUMENTS 7,131,008 B1 * 10/2006 Liu ................... G06F 21/602
                                                     713/182
9,503,452 B1 * 11/2016 Kumar ................ H04L 63/0838
2006/0259495 A1 * 11/2006 Huang .............. G06F 16/24539
2010/0098253 A1 * 4/2010 Delerablee ............ H04L 9/0833
                                                     380/259

OTHER PUBLICATIONS

Appenzeller, G, "Identity-Based Encryption Architecture and Supporting Data Structures", RFC 5408, (Jan. 2009), 30 pgs.
Boneh, Franklin D, "Identity-Based Encryption from the Weil Pairing", In: Kilian J. (eds) Advances in Cryptology—CRYPTO 2001 Lecture notes in Computer Science vol. 2139, (2001), 31 pgs.
Boyen, X, et al., "Identity-Based Cryptography Standard (IBCS) #1: Supersingular Curve Implementations of the BF and BB1 Cryptosystems", RFC 5091, (Dec. 2007), 63 pgs.
Silverman, Joseph, "The Arithmetic of Elliptic Curves", New York: Springer-Verlag. ISBN 0-387-96203-4.

* cited by examiner

*Primary Examiner* — Quazi Farooqui
(74) *Attorney, Agent, or Firm* — Schwegman Lundberg & Woessner, P.A.

(57) ABSTRACT

System and techniques for decentralized key generation and management are described herein. An information centric network (ICN) node receives a first ICN interest packet for public encryption parameters of an identity based encryption (IBE) key generation center (KGC). Public encryption parameters for the KGC are received in a first ICN data packet in response to the first ICN interest packet. The public encryption parameters are cached and used to respond a second ICN interest packet for the public parameters. A third ICN data packet may be received from the KGC in response to a key generation request. Here, the third data packet includes an indication that the third ICN data packet is part of a one-time session. Then, the third ICN data packet is transmitted without caching the third ICN data packet content based on the indication.

21 Claims, 16 Drawing Sheets

DECENTRALIZED KEY GENERATION AND MANAGEMENT

TECHNICAL FIELD

Embodiments described herein generally relate to cryptographic key exchanges and more specifically to decentralized key generation and management.

BACKGROUND

Edge computing comprises data and computing infrastructure located closer to requestors to achieve very low latencies and high bandwidths typical of many demanding, emerging usages including those in 5G and 6G cellular networks. Edge computing contrasts to delivering web-scale services globally through traditional cloud datacenters. Information centric networks (ICNs) implement protocols and mechanisms that enable requestors to ask for information and computational services directly by their names. ICNs are contrasted with traditional address-based networks and protocols in which such requests are made by addressing specific end-points (e.g., host or service Internet Protocol (IP) addresses). ICN protocols or mechanisms are often viewed as well matched to edge computing architectures because ICNs are naturally decentralized—due to a distributed peer-to-peer model of access—ICNs may resiliently access information from anywhere it is cached, and ICNs auto-adapt to request patterns through intrinsic multicasting and forwarding strategies. Unlike address-based networks—which are engineered to consciously route traffic to intermediaries such as forward or reverse proxy caches—ICNs handle the complexity of edge computing without onerous configuration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
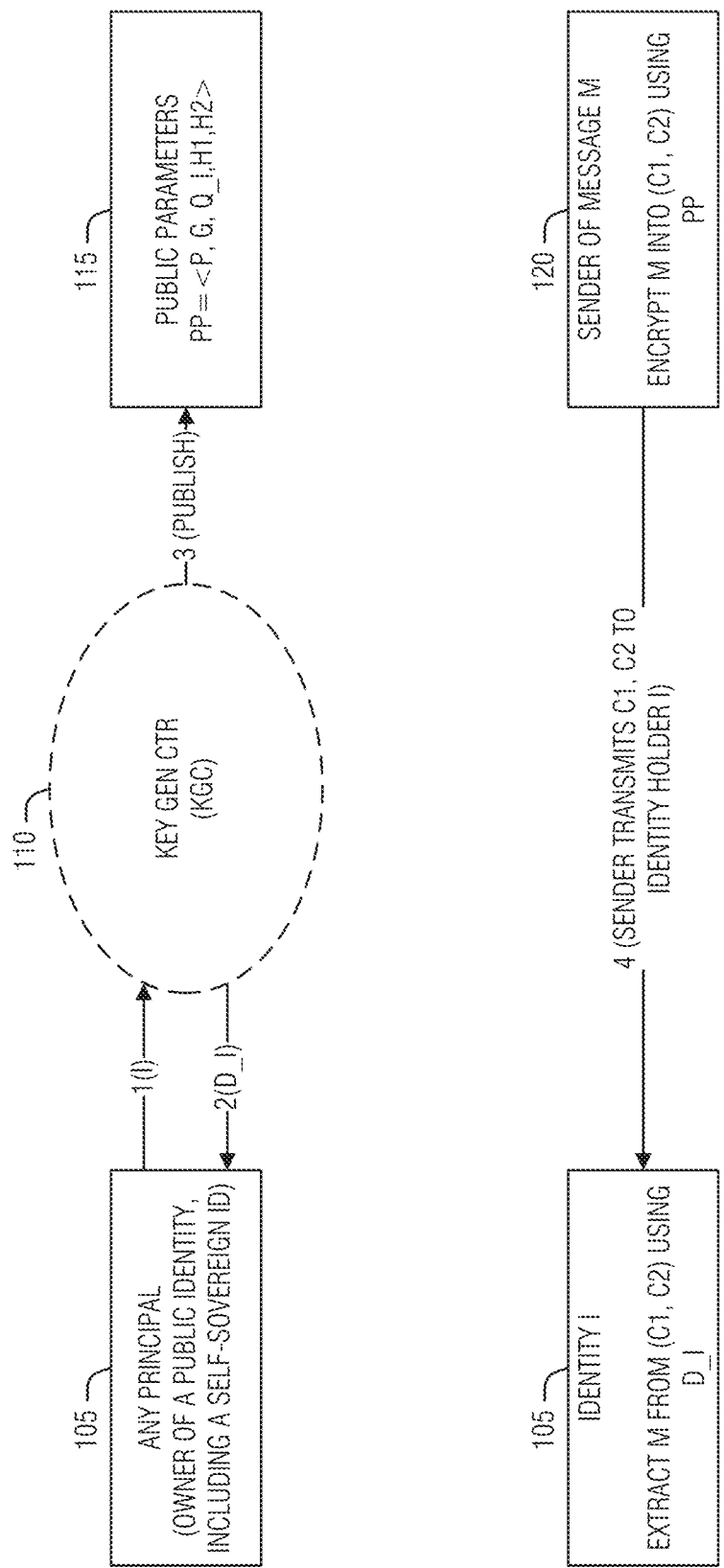
FIG. 1 illustrates an example of decentralized key generation, according to an embodiment.

Networked access, such as is typical in edge computing—may be prone to attacks by malicious entities. Generally, encryption is used to protect data and preserve privacy of data accesses. Cryptographic techniques attempt to ensure, for example, that a person or account such as Ptolemy@Geocentric.com can access a machine or a resource such as www.Copernicus.com, and that such an access is not interfered with by another pretending to be the provider of the data being accessed (e.g., a spoofing attack). Cryptographic security also attempts to prevent the data being accessed or messages flowing back from the access target from being manipulated so as to corrupt them. Further, cryptographic security techniques help to ensure that discovering sensitive information that only the accessor is meant to receive from the accessed target is discovered. Typically, cryptographic security techniques employ encryption and encryption-protected authentication through end to end handshakes over secure sockets layer (SSL) SSL or transport layer security (TLS) sessions, or by using datagram TLS (DTLS), or other variants. Generally, the encryption techniques rely on long, randomly generated keys that are associated with identities; such association is usually based on unforgeable, digitally signed documents which are called "Certificates".

It is common for a public key of a particular entity, such as a website, to be a long string of bits. Here, a requestor cannot be sure that the key indeed belongs to that particular entity without relying on a binding credential. That binding credential exists in the form of a certificate. A typical certificate attests to the authenticity of the website along with that of the public key for that website. Accordingly, a requestor can trust a symmetric key negotiated during a TLS or SSL session by using the public key to encrypt communications with the website. A certificate also attests various parameters—such as the certificate's validity period, the issuer, the signature algorithm, etc.—enabling each field in the certificate to be checked for its integrity. The infrastructure and processes for managing these certificates is inherently centralized through the existence of various Certificate Authorities (CAs) that provide the certificates along with their signatures attesting to authenticity of locators—such as, IP addresses or universal resource locators (URLs)—used to reach various machines, files, services, etc. Managing certificates and compliance requirements among multiple parties in certificate management creates barriers for scaling operations as well as the agility (e.g., ability to adapt to differing circumstances) of operations. These issues are exacerbated in decentralized and opportunistic communications that are common in edge computing. For example, consider that devices in a home or a building first need to be authenticated with each new device contacted—a common occurrence—resulting in fetching a certificate before communicating (e.g., encrypting and decrypting) with each new identity. Often this entails corresponding with different CAs or their delegate CAs, because not all devices are attested to by a common CA.

IBE (Identity based encryption) and IBPKE (identity based public key encryption) may be used to avoid the need for certificates and CAs. IBE may better support edge computing and 5G communications that have a dramatic increase, over more traditional communications, in the frequency of unplanned interactions arising ubiquitously among peripatetic devices, people, sources and caches of information, and networked logic that can perform named operations. IBE operates on the idea that an entity's identity—such as its name, its biometric characteristics, etc.—are sufficient for any other entity to communicate with it using asymmetric encryption. Here, the public parameters for the encryption are freely and widely available without any centralizing authority, such as a CA needed for binding them to the entity's identity. The result is an effective decentralizing of cryptography. In place of CAs, IBE uses Key Generation Centers (KGCs) that provide a trusted service of publishing an association between an identity and a private key for that identity. The KGC creates the private key for the holder of the identity that the holder of the identity then uses to sign documents or decrypt communications addressed to that identity.

Discovering and using KGCs may still be a challenge in edge computing environments. However, as the public parameters of the KGC are generally static, Information Centric Networking (ICN) networks may provide an effective platform to further decentralize cryptography. Here, the KGC may be implemented as a named function in an ICN. When an entity requests the public parameters for any other second entity by the second entity's identity, the parameters are requested by name. The ICN network routes the interest packet to the KGC and the public parameters are returned to the requester. As the data traverses the network, the data may be cached at any intervening device, the data tied to the name used to request the data, and the data tied unforgeably to the KGC's identity by the KGC's signature. Thus, any subsequent request for the parameters may use the cached version, reducing workload on the network and the KGC. A special case may exist for the private key request by the identity holder. This is an exchange in which data caching is generally not useful, and may even be insecure. Here, an ICN flag or other indication may be used to ensure that the ICN infrastructure does not cache data packets used in the private key exchange.

In the details and examples described below, NFN KGCs—KGCs implemented as functions in an ICN network may also be referred to as named function networking (NFN) KGCs—result in a resilient distributed service that is invokable by name and is capable of being placed on differentiated hardware that can provide higher levels of acceleration and resistance to attack than other techniques. NFN KGCs address a gap, or a missing opportunity between IBE and edge operations facilitated by the core ICN principle of accessing something by its name, without having to know where it is located. This enables provisioning a KGC as a named function node or a named function service, so that there is no need for any party in a given network to have to know and contact a particular host for the purposes of minting an IBE secret key for itself or for any data or function it seeks to provide to others by name (e.g., by name of data or by name of the function that party wants to serve). Additional details and examples are provided below.

FIG. 1 illustrates an example of decentralized key generation, according to an embodiment. IBE employs a Weil pairing to establish bilinear group maps $$(G1 \times G1 \xrightarrow{e} G2)$$

satisfying three properties:

for all u, v in G1, $e(u^a, v^b)=e(u,v)^{ab}$ in G2.
for a generator g of G1, e (g, g) is a generator of G2.
the map e is efficiently computable.

Identities are mapped into G1 by cryptographically strong hash functions h1( ) over the identities, while a second hash function h2( ) generates a mask in the form of a binary string (e.g., S) from a computed element in G2 such that the sender of a message M 120 can apply S to transform the plaintext into cyphertext. The computed element in G2 from which the binary string mask S is produced is a function of the identity ID and a random number r that is selected by the sender of a message 120 to a receiver 105 with the identity ID.

The KGC 110 provides a private key dID (illustrated as D_I) to a receiver 105 that requests a secret key for a given ID. The receiver 105 may furnish a proof of ownership or proof of authenticity of the ID to the KGC 110 that may be local to the domain in which the receiver 105 and a KGC 110 belong. For example, a KGC 110 in the private domain employees.justSomeCompany.com may have a number of alternative techniques by which to establish that an employee—such as aPerson@justSomeCompany—is who the person claims to be by issuing a challenge-response through email, smartphone, etc. The KGC 110 also publishes public parameters g, h1, h2, and qID (illustrated as Q-I). Here, the correspondence (dID→qID) over identities is easily computed and published by the KGC 110. However, the correspondence generally cannot be broken down by other parties into its constituent parts.

The sender 120 of a message M to an identity ID draws a random number r and then computes a cyphertext tuple [C1(r), C2(M, ID)], where C1=$g^r$ and C2 (M, ID)=M $\otimes$h2 ($e$(h1(ID), $q_{ID}$)$^r$). The receiver 105 recovers the message M by performing the operation C2 $\otimes$h2($e$($d_{ID}$,C1)). This effectively reverses the obfuscation that the sender 120 performed through r due to the first property of the bilinear mapping. Briefly, C2 $\otimes$h2($e$($d_{OID}$, C1))=M $\otimes$h2($e$(h1(ID), $q_{ID}$)$^r$) $\otimes$h2($e$($d_{ID}$, C1)) where $q_{ID}$ equals $g^\alpha$, $d_{ID}$=h1(ID)$^\alpha$ by construction of the private key and therefore the last two terms become identical due to bilinearity of the mapping e, and their exclusive-or produces identity, effectively yielding back M.

Figure 2:
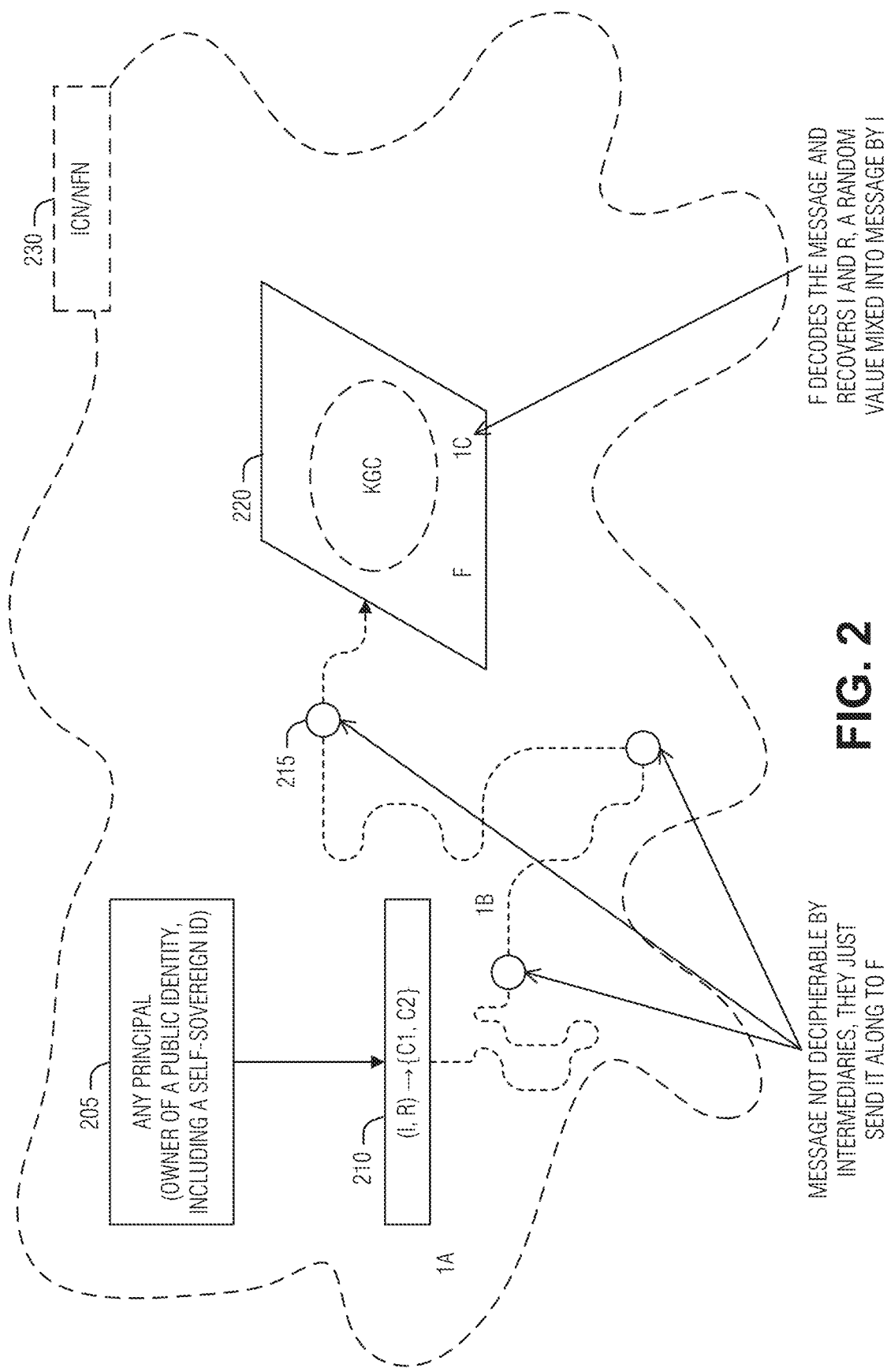
FIG. 2 illustrates an example of decentralized key generation request to an NFN KGC, according to an embodiment.

FIG. 2 illustrates an example of decentralized key generation request to an NFN KGC 220, according to an embodiment. Here, the KGC 220 is a function implemented on one or more nodes of the ICN network 230. The KGC 220 may be implemented in a host, a virtual machine (VM), container, or other environment of the ICN network 230 that implements a KGC capability. In an example, the KGC 220 may be implements in a container or a VM that may have migrated from an initial host in the ICN network 230 to a second host in the ICN network 230 that is, for example, closer to edge requesters.

The KGC 220 is denoted with the name "F" in FIG. 2. A principal, such as the principal 205, for a particular identity i may request the KGC 220 to produce a secret key Di by simply naming "F" in an interest packet for the request. The KGC 220 has a well-known set of public parameters associated with itself. Thus, to make the private key generation request, the requestor 205 computes a cypher text 210 (operation 1A) using those public parameters, the cyphertext having the message M that contains the identity i and random number r both as message payload and as a cyphertext producer for the message. The message is then sent through the ICN network (operation 1B) to eventually arrive at the KGC 220. The KGC 220 then decodes the message (operation 1C)—using the private aspects of the public parameters—and recovers the identity i together with the random number r that was sent along with the identity.

Figure 3:
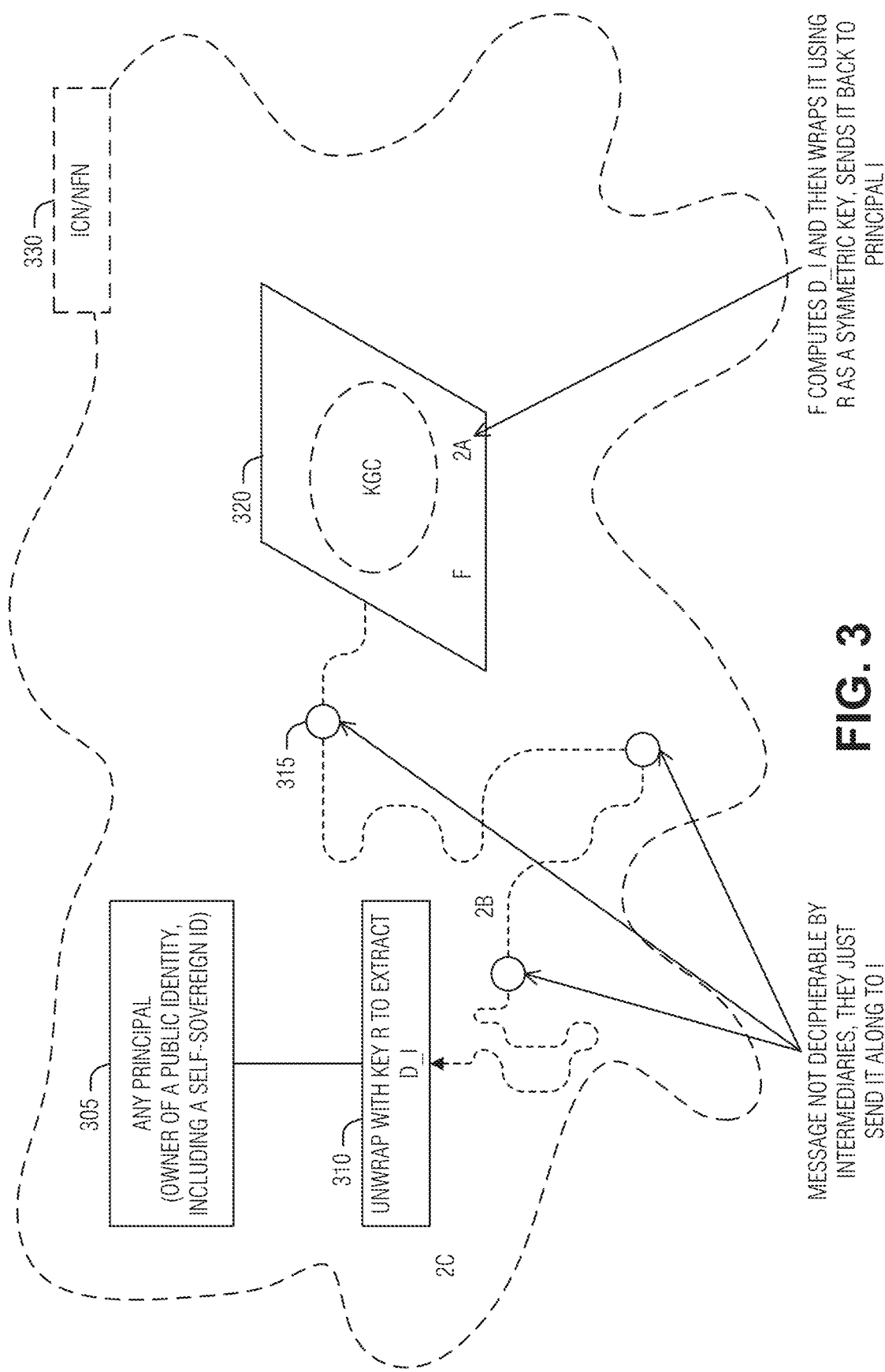
FIG. 3 illustrates an example of decentralized key generation response from an NFN KGC, according to an embodiment.

FIG. 3 illustrates an example of decentralized key generation response from an NFN KGC 320, according to an embodiment. The scenario illustrated in FIG. 3 follows the secure delivery of the Di requested in FIG. 2. The KGC 320 computes the secret key Di (operation 2A). The KGC 320 also uses the random number r that the principal 305 had inserted into the payload as a shared-secret (e.g., symmetric) key. Other techniques may be used to secure the delivery of the secret key Di to the principal 305, such as using r to derive a secret key that is produced by hashing the key r using a cryptographic function that is published as a public parameter of the KGC 320. Whenever a secret component of the original request, such as r is used to secure the return communication, the communication is secure. When using a random number, like r, that will not be used again, the communication is very difficult to attack.

Further both the messages 1A and 2A are generally small in size—perhaps containing only the identity i, the random number r, the secret key, and possibly a nonce to prevent replay of previously transmitted payloads. Thus, session establishment is generally not necessary, enabling the public parameters to provide security to the KGC 320 and the random number r to provide security back to the principal 305.

The secret key Di is protected by the one-time secret key from r and is then sent back to the requestor by the KGC 320 (operation 2B). As noted above, using r to protect the return message 315 causes the message 315 to be undecipherable by anyone other than the requestor, the principal 305. Note that the return message 315 is a one-time message that cannot be used—and would be undesirable if it were used—by any entity other than the principal 305. Thus, the standard caching behavior of ICN is either wasteful or insecure with respect to the message 315. Metadata with the response message 315 may indicate to the intermediaries (e.g., ICN routers or other forwarding devices of the ICN network 330) that there is no need to place the response into their respective content stores (e.g., local cache).

When the response 315 reaches the principal 305, the principal 305 recovers the secret key Di by unwrapping 310 it with secret key that the requestor implicitly established with the KGC 320 via the original random number r (operation 2C).

The KGC 320 may publish all of its public parameters for everyone to cache and access using mechanisms of the ICN network 330. In this way, both the invocation of KGC 320 for obtaining secret keys, and for senders (e.g., those devices attempting to send encrypted communications to the principal 305) who are using the public parameters to perform IBE do not require knowledge of a specific host nor a need to know how to obtain that KGC's public parameters. Rather, the principal 305 simply produces an interest naming the KGC 320 and senders simply create an interest for the public parameters of the KGC 320. Like anything else in an the ICN network 330, simply using the name of the KGC 320 and the KGC public parameters will correctly route the messages. Moreover, because the KGC public parameters are likely cached after a first request, the round-trip response time to a sender is likely small as an ICN routing node will likely cache the public parameters after just one initial request for them.

Figure 4:
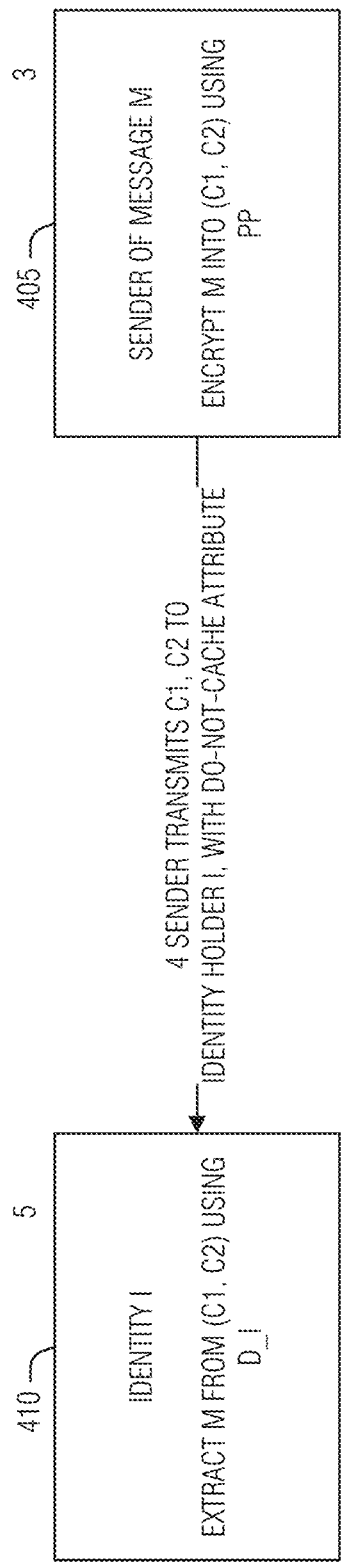
FIG. 4 illustrates an example of using a key generated by an NFN KGC, according to an embodiment.

FIG. 4 illustrates an example of using a key generated by an NFN KGC, according to an embodiment. The illustrated technique includes an indication (e.g., a tag, attribute, etc.) that a receiver specific communication from a sender 405 to a principal 410 should not be cached by ICN nodes through which the message may transit. Generally, IBE communications are not useful to others because they cannot be decrypted by others, and thus waste cache resources in the ICN nodes. However, such a tag may be omitted, enabling use cases in which the receiver 410 is not a single node, but rather distributed among several physical nodes as in the case of a widely accessed and cached content delivery service. In these scenarios, any of the distributed nodes may make use of the communication.

Figure 5:
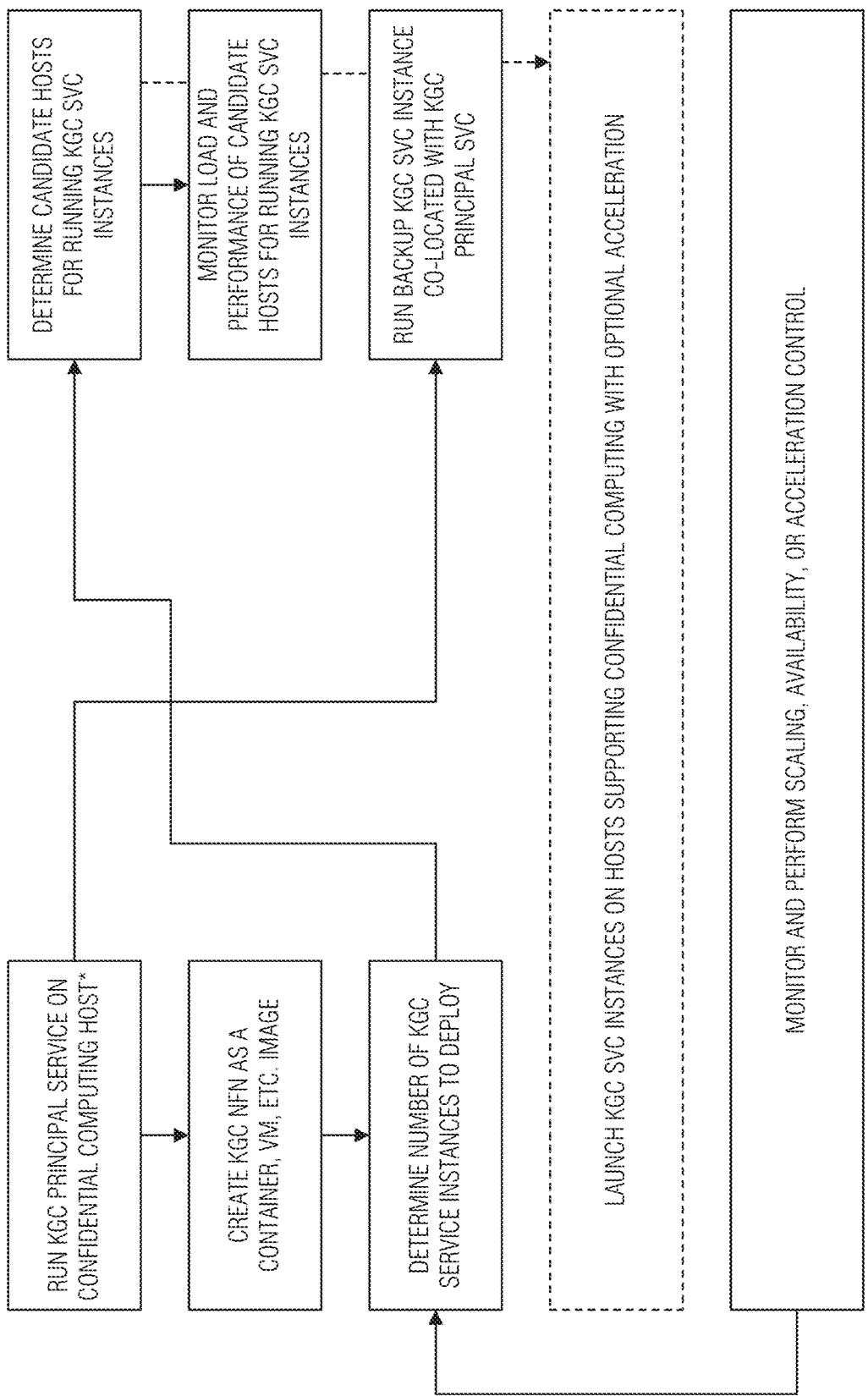
FIG. 5 illustrates an example of hosting a KGC in multiple instances within an NFN, according to an embodiment.

FIG. 5 illustrates an example of hosting a KGC in multiple instances within an NFN, according to an embodiment. The implementation of the KGC above is generally described from the perspective of a single function hosted by a single physical node. However, any number of physical nodes may host any number of KGC functions as long as the secret and public parameters are shared, resulting in cloned KGCs. This collection may be referred to as KGC-as-a-Service (KGCaaS). Because any KGCaaS will responding to either key generation requests or public parameter request in the same manner, using a KGCaaS is identical to using a KGC for principals and requesters. In an example, the KGCaaS uses one of more instances of KGC in a service control framework to provide automatic scaling and resiliency of the key generation service to transient partitions in the network.

In an example, the KGCaaS may be implemented with an instance of a KGC principal service that controls the autoscaling and resiliency of all the instances of a KGCaaS. In an example, the KGC principal service includes, within it or alongside it, a KGC service instance of last resort. This instance of last resort operates a KGC if needed. The KGC principal service creates a template container (a container image, a VM image, etc.) in which the KGC NFN is implemented.

The KGC principal service determines the number of KGC instances and which physical edge locations and nodes are suitable for running those instances. The identified nodes and service instances, together with the backup service instance (e.g., the KGC service instance of last resort), are launched and then monitored by the KGC principal service for load, service level agreement (SLA) compliance, performance, etc. The KGC principal service may periodically use the metrics from the monitoring to adjust instances at times launching new instances and at other times suspending or migrating current instances to fit current workloads.

In an example, the node hosting the KGC principal service or the nodes hosting the instances may include one or more of the hardware and system properties, such as being equipped with hardware acceleration for the various bilinear mapping computations (G1×G1→G2). The nodes may be equipped with confidential computing support, such as software guard extensions, trusted domain extensions, etc. The nodes may include high reliability attributes (e.g., reliability, availability serviceability (RAS) features), such as greater support for mirroring, device redundancies, specially designed for memory integrity, etc. The nodes may be physically and logically better protected against intrusion both direct, and over a network. The nodes may run very thin operating systems partitioned into thin microkernels so that the attack surface against system software is very small.

Figure 6:
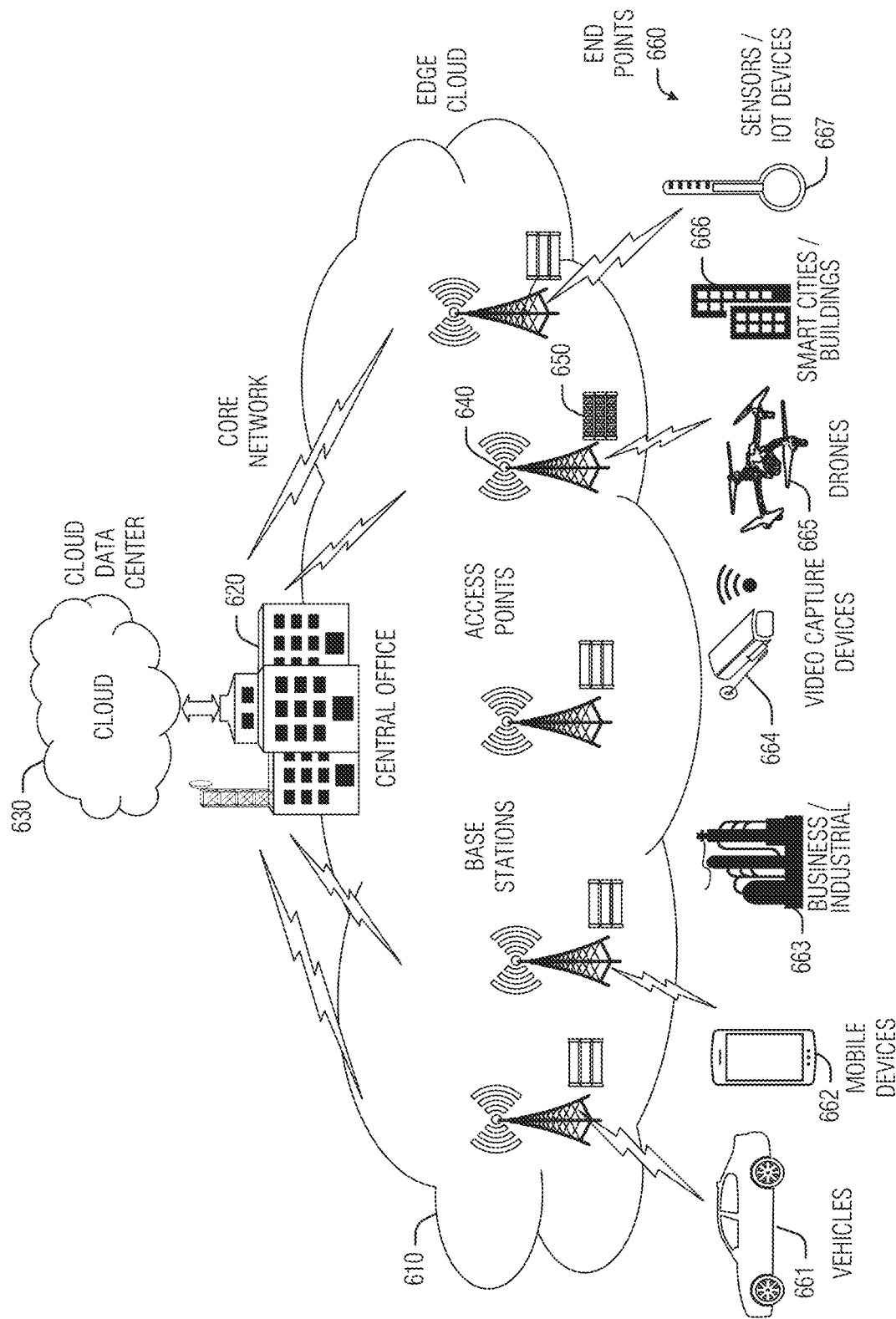
FIG. 6 illustrates an overview of an edge cloud configuration for edge computing.

FIG. 6 is a block diagram showing an overview of a configuration for edge computing, which includes a layer of processing referred to in many of the following examples as an "edge cloud". As shown, the edge cloud 610 is co-located at an edge location, such as an access point or base station 640, a local processing hub 650, or a central office 620, and thus may include multiple entities, devices, and equipment instances. The edge cloud 610 is located much closer to the endpoint (consumer and producer) data sources 660 (e.g., autonomous vehicles 661, user equipment 662, business and industrial equipment 663, video capture devices 664, drones 665, smart cities and building devices 666, sensors and IoT devices 667, etc.) than the cloud data center 630. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
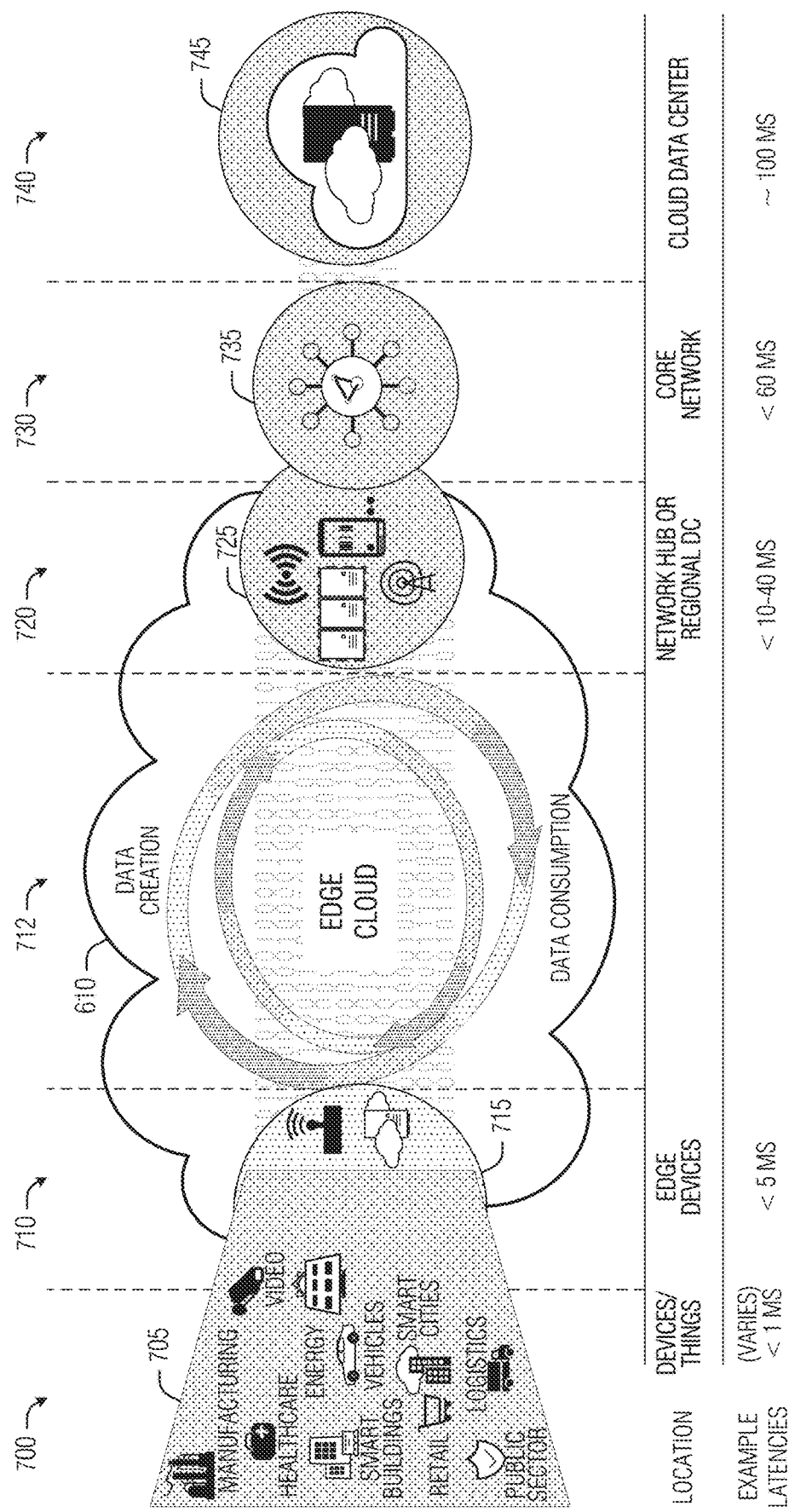
FIG. 7 illustrates operational layers among endpoints, an edge cloud, and cloud computing environments.

FIG. 7 illustrates operational layers among endpoints, an edge cloud, and cloud computing environments. Specifically, FIG. 7 depicts examples of computational use cases 705, utilizing the edge cloud 610 among multiple illustrative layers of network computing. The layers begin at an endpoint (devices and things) layer 700, which accesses the edge cloud 610 to conduct data creation, analysis, and data consumption activities. The edge cloud 610 may span multiple network layers, such as an edge devices layer 710 having gateways, on-premise servers, or network equipment (nodes 715) located in physically proximate edge systems; a network access layer 720, encompassing base stations, radio processing units, network hubs, regional data centers (DC), or local network equipment (equipment 725); and any equipment, devices, or nodes located therebetween layer 712, not illustrated in detail). The network communications within the edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 700, under 5 ms at the edge devices layer 710, to even between 10 to 40 ms when communicating with nodes at the network access layer 720. Beyond the edge cloud 610 are core network 730 and cloud data center 740 layers, each with increasing latency (e.g., between 50-60 ms at the core network layer 730, to 100 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 735 or a cloud data center 745, a central office or content data network may be considered as being located within a "near edge" layer ("near" to the cloud, having high latency values when communicating with the devices and endpoints of the use cases 705), whereas an access point, base station, on-premise server, or network gateway may be considered as located within a "far edge" layer ("far" from the cloud, having low latency values when communicating with the devices and endpoints of the use cases 705). It will be understood that other categorizations of a particular network layer as constituting a "close", "local", "near", "middle", or "far" edge may be based on latency, distance, number of network hops, or other measurable characteristics, as measured from a source in any of the network layers 700-740.

The various use cases 705 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 610 (network layers 700-740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 610.

As such, the edge cloud 610 is formed from network components and functional features operated by and within edge gateway nodes, edge aggregation nodes, or other edge compute nodes among network layers 710-730. The edge cloud 610 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., long-range wireless, wired networks including optical networks) may also be utilized in place of or in combination with such 3GPP carrier networks.

The network components of the edge cloud 610 may be servers, multi-tenant servers, appliance computing devices, or any other type of computing devices. For example, the edge cloud 610 may include an appliance computing device that is a self-contained electronic device including a housing, a chassis, a case, or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11B. The edge cloud 610 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code, or scripts.

Figure 8:
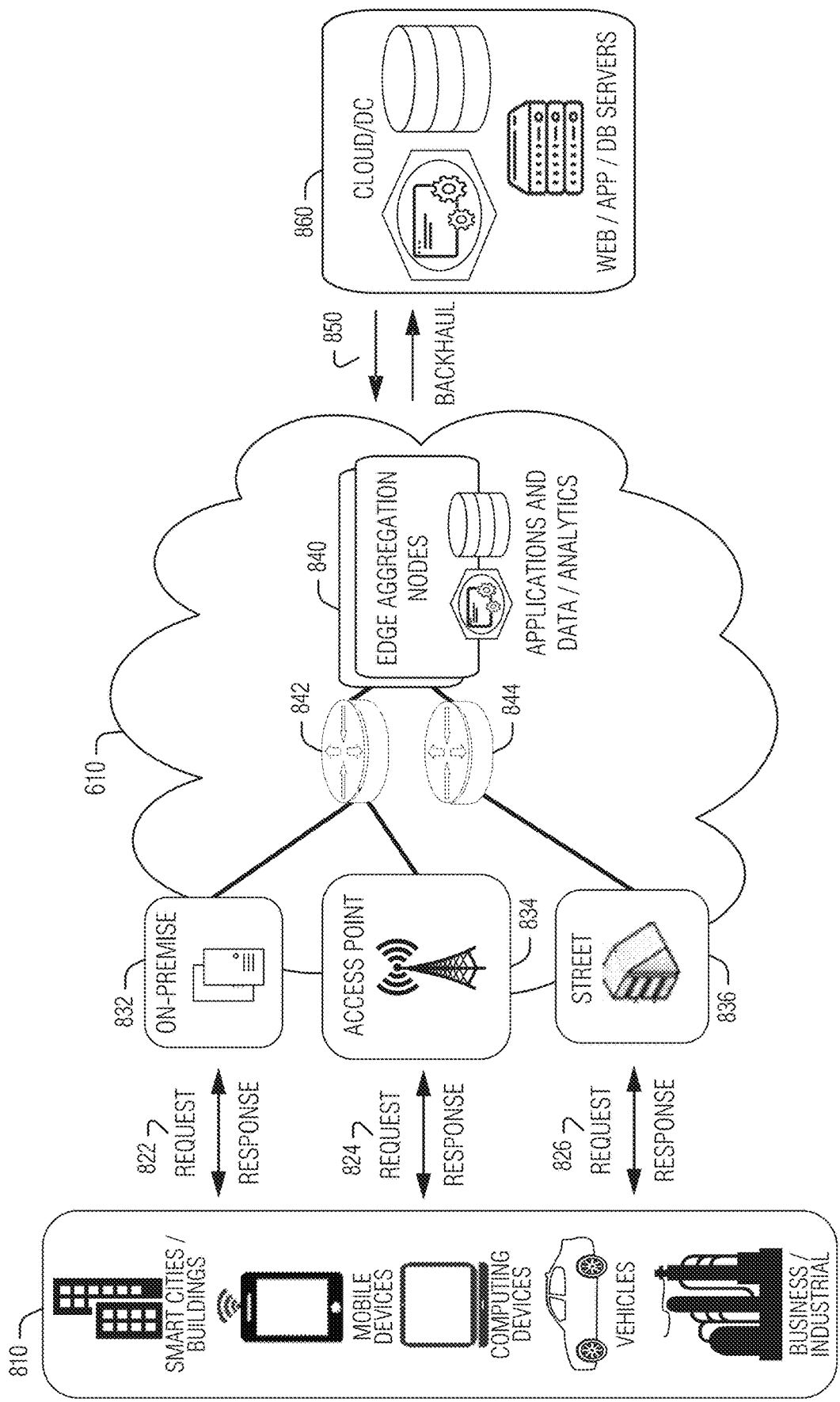
FIG. 8 illustrates an example approach for networking and services in an edge computing system.

In FIG. 8, various client endpoints 810 (in the form of mobile devices, computers, autonomous vehicles, business computing equipment, industrial processing equipment) exchange requests and responses that are specific to the type of endpoint network aggregation. For instance, client endpoints 810 may obtain network access via a wired broadband network, by exchanging requests and responses 822 through an on-premise network system 832. Some client endpoints 810, such as mobile computing devices, may obtain network access via a wireless broadband network, by exchanging requests and responses 824 through an access point (e.g., cellular network tower) 834. Some client endpoints 810, such as autonomous vehicles may obtain network access for requests and responses 826 via a wireless vehicular network through a street-located network system 836. However, regardless of the type of network access, the TSP may deploy aggregation points 842, 844 within the edge cloud 610 to aggregate traffic and requests. Thus, within the edge cloud 610, the TSP may deploy various compute and storage resources, such as at edge aggregation nodes 840, to provide requested content. The edge aggregation nodes 840 and other systems of the edge cloud 610 are connected to a cloud or data center 860, which uses a backhaul network 850 to fulfill higher-latency requests from a cloud/data center for websites, applications, database servers, etc. Additional or consolidated instances of the edge aggregation nodes 840 and the aggregation points 842, 844, including those deployed on a single server framework, may also be present within the edge cloud 610 or other areas of the TSP infrastructure.

Figure 9:
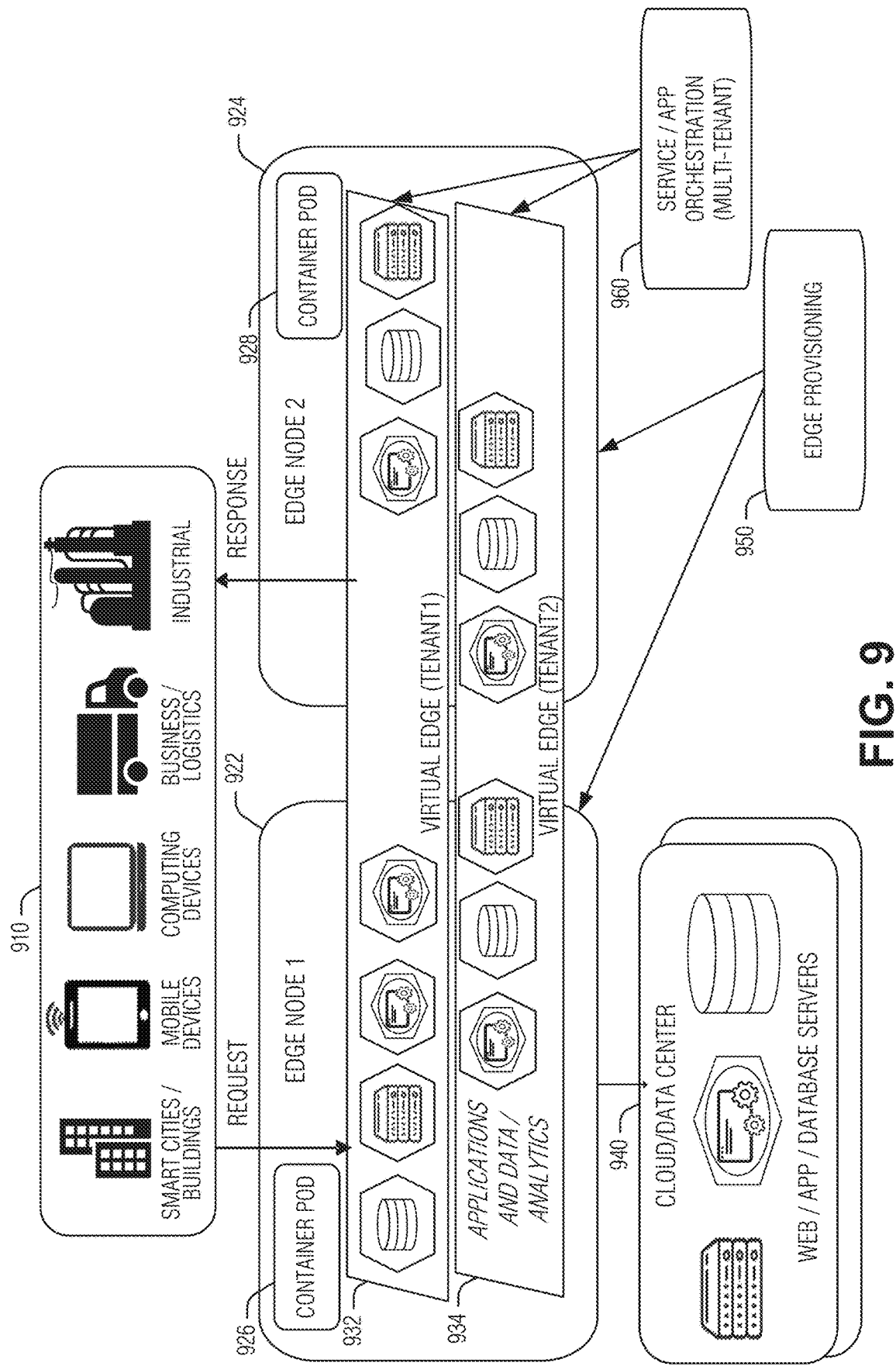
FIG. 9 illustrates deployment of a virtual edge configuration in an edge computing system operated among multiple edge nodes and multiple tenants.

FIG. 9 illustrates deployment and orchestration for virtualized and container-based edge configurations across an edge computing system operated among multiple edge nodes and multiple tenants (e.g., users, providers) which use such edge nodes. Specifically, FIG. 9 depicts coordination of a first edge node 922 and a second edge node 924 in an edge computing system, to fulfill requests and responses for various client endpoints 910 (e.g., smart cities/building systems, mobile devices, computing devices, business/logistics systems, industrial systems, etc.), which access various virtual edge instances. Here, the virtual edge instances 932, 934 provide edge compute capabilities and processing in an edge cloud, with access to a cloud/data center 940 for higher-latency requests for websites, applications, database servers, etc. However, the edge cloud enables coordination of processing among multiple edge nodes for multiple tenants or entities.

In the example of FIG. 9, these virtual edge instances include: a first virtual edge 932, offered to a first tenant (Tenant 1), which offers a first combination of edge storage, computing, and services; and a second virtual edge 934, offering a second combination of edge storage, computing, and services. The virtual edge instances 932, 934 are distributed among the edge nodes 922, 924, and may include scenarios in which a request and response are fulfilled from the same or different edge nodes. The configuration of the edge nodes 922, 924 to operate in a distributed yet coordinated fashion occurs based on edge provisioning functions 950. The functionality of the edge nodes 922, 924 to provide coordinated operation for applications and services, among multiple tenants, occurs based on orchestration functions 960.

It should be understood that some of the devices in 910 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 922, 924 may operate as security feature enforcement points for local resources allocated to multiple tenants per node. Additionally, tenant runtime and application execution (e.g., in instances 932, 934) may serve as an enforcement point for a security feature that creates a virtual edge abstraction of resources spanning potentially multiple physical hosting platforms. Finally, the orchestration functions 960 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 910, 922, and 940 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 9. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 922, 924 may implement the use of containers, such as with the use of a container "pod" 926, 928 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 932, 934 are partitioned according to the needs of each container.

With the use of container pods, a pod controller oversees the partitioning and allocation of containers and resources.

The pod controller receives instructions from an orchestrator (e.g., orchestrator 960) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 960 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 10:
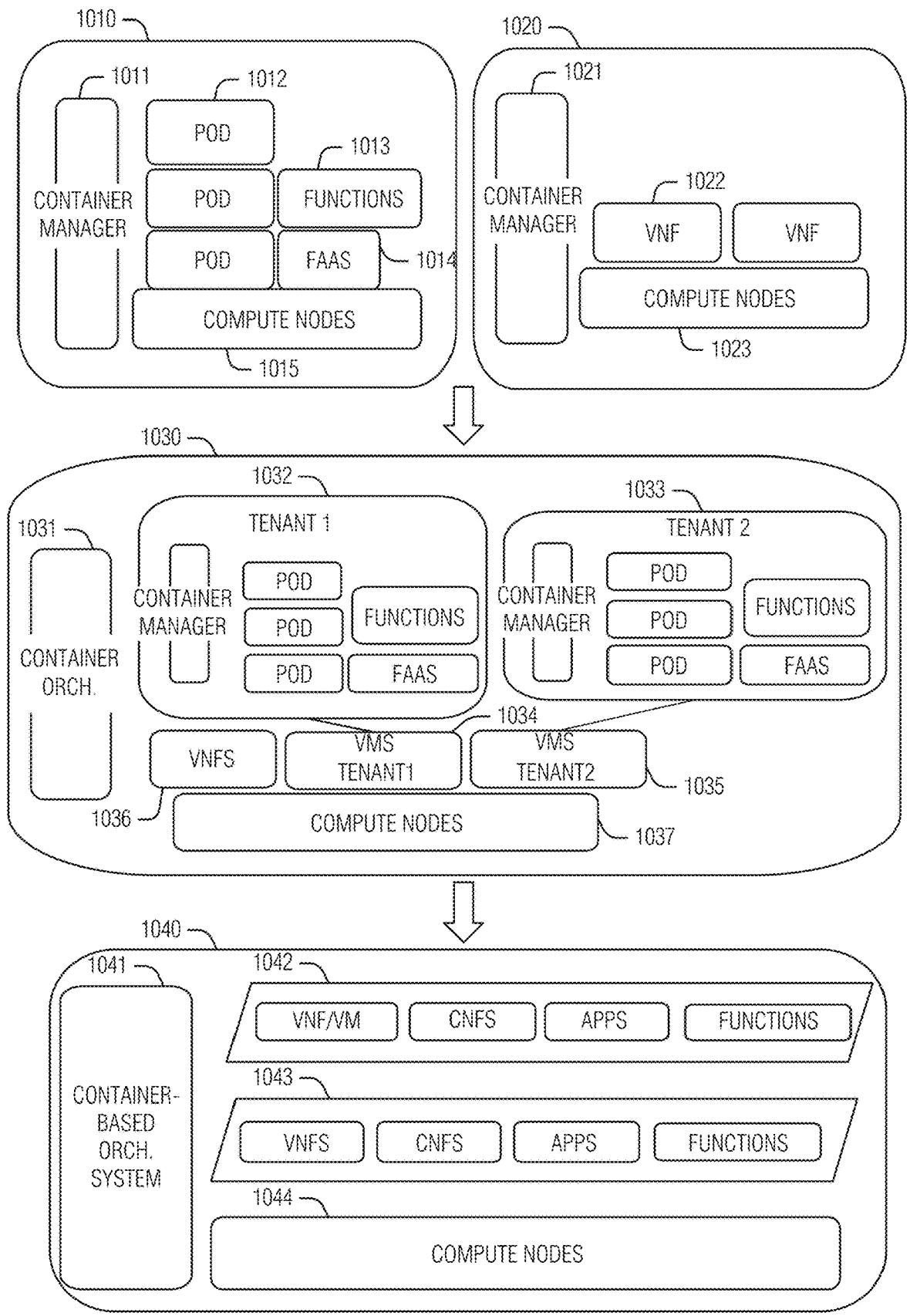
FIG. 10 illustrates various compute arrangements deploying containers in an edge computing system.

FIG. 10 illustrates additional compute arrangements deploying containers in an edge computing system. As a simplified example, system arrangements 1010, 1020 depict settings in which a pod controller (e.g., container managers 1011, 1021, and container orchestrator 1031) is adapted to launch containerized pods, functions, and functions-as-a-service instances through execution via compute nodes (1015 in arrangement 1010), or to separately execute containerized virtualized network functions through execution via compute nodes (1023 in arrangement 1020). This arrangement is adapted for use of multiple tenants in system arrangement 1030 (using compute nodes 1037), where containerized pods (e.g., pods 1012), functions (e.g., functions 1013, VNFs 1022, 1036), and functions-as-a-service instances (e.g., FaaS instance 1014) are launched within virtual machines (e.g., VMs 1034, 1035 for tenants 1032, 1033) specific to respective tenants (aside the execution of virtualized network functions). This arrangement is further adapted for use in system arrangement 1040, which provides containers 1042, 1043, or execution of the various functions, applications, and functions on compute nodes 1044, as coordinated by an container-based orchestration system 1041.

The system arrangements of depicted in FIG. 10 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 10, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 11A and 11B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 11A:
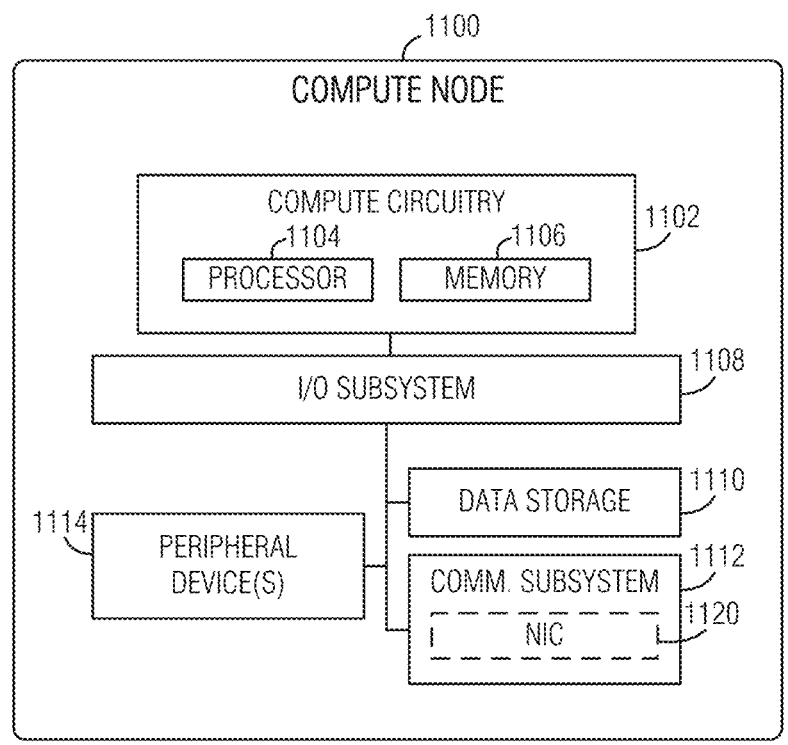
FIG. 11A provides an overview of example components for compute deployed at a compute node in an edge computing system.

In the simplified example depicted in FIG. 11A, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may he embodied as, include, or be coupled to an FPGA, an application specific integrated circuit (ASIC), reconfigurable hardware or hardware circuitry, or other specialized hardware to facilitate performance of the functions described herein. Also in some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry or components to facilitate input/output operations with the compute circuitry 1102 (e.g., with the processor 1104 or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Individual data storage devices 1110 may include a system partition that stores data and firmware code for the data storage device 1110. Individual data storage devices 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the NIC 1120 may include a local processor (not shown) or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

Figure 11B:
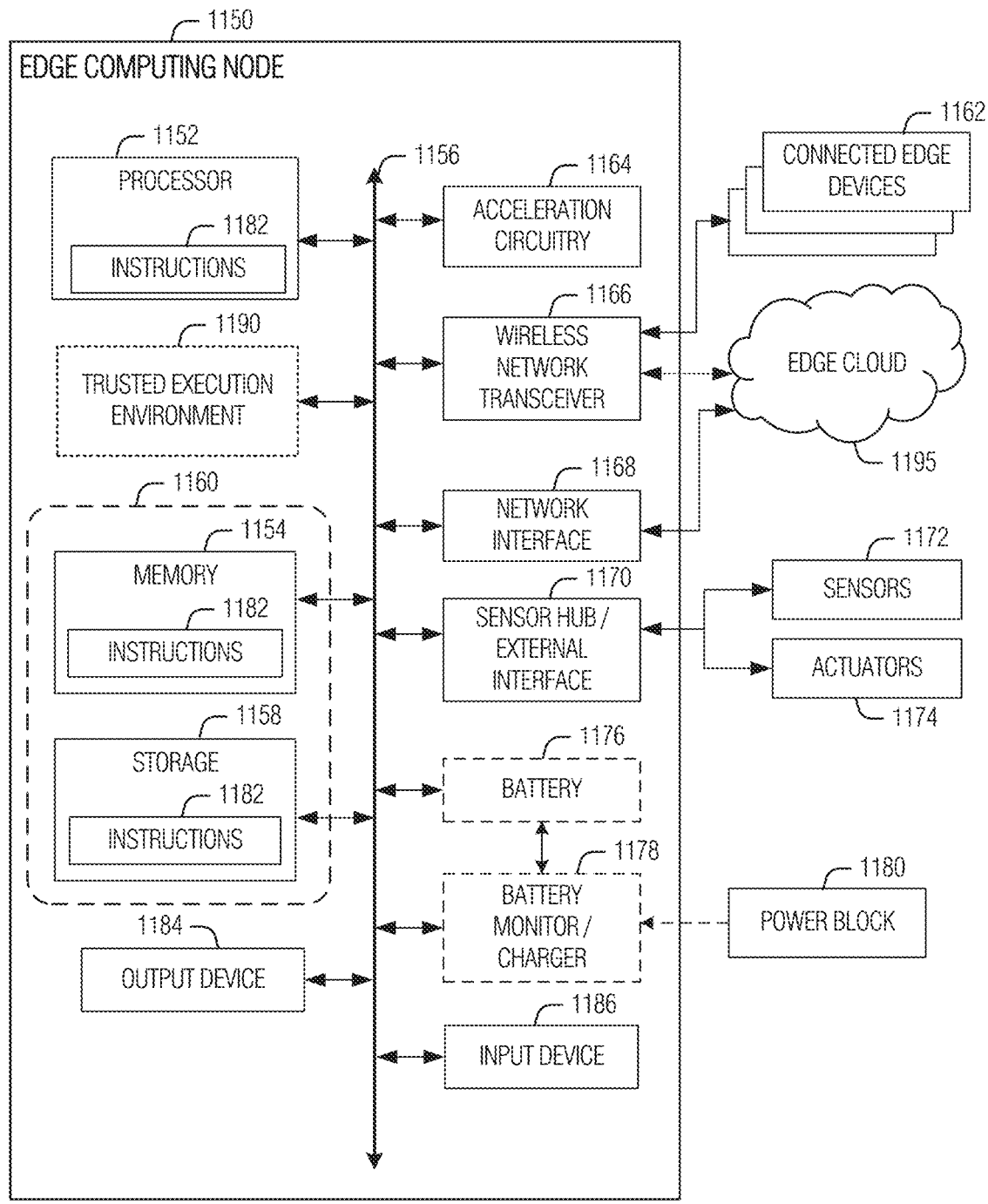
FIG. 11B provides a further overview of example components within a computing device in an edge computing system.

In a more detailed example, FIG. 11B illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California As an example, the processor 1152 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 11B.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2SDRAM, JESD79-3F for DDR3 SDRAM, JESD79-4A for DDR4 SDRAM JESD209 for Low Power DDR), (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDI)). Other devices that may be used for the storage 1158 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may he included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
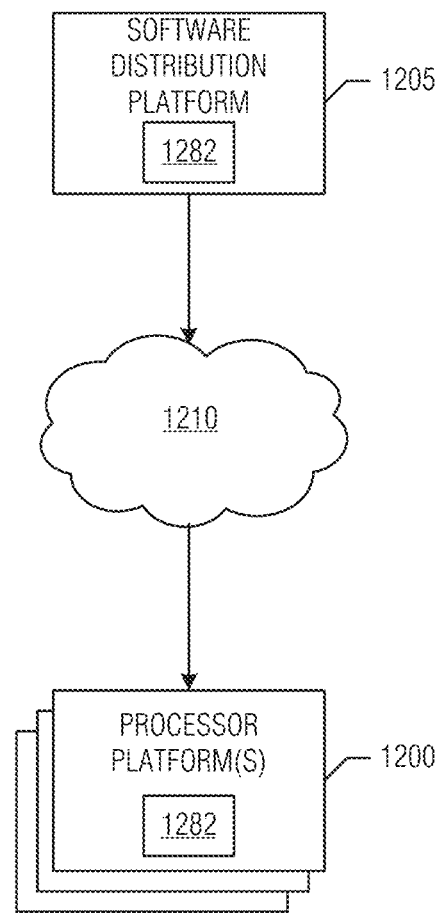
FIG. 12 illustrates an example software distribution platform to distribute software.

FIG. 12 illustrates an example software distribution platform 1205 to distribute software, such as the example computer readable instructions 1282 of FIG. 12, to one or more devices, such as example processor platforms) 1200 or connected edge devices. The example software distribution platform 1205 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1205). Example connected edge devices may operate in commercial or home automation environments. In some examples, a third party is a developer, a seller, or a licensor of software such as the example computer readable instructions 1282 of FIG. 12. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 12, the software distribution platform 1205 includes one or more servers and one or more storage devices. The storage devices store the computer readable instructions 1282, which may correspond to the example computer readable instructions illustrated in the figures and described herein. The one or more servers of the example software distribution platform 1205 are in communication with a network 1210, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1282 from the software distribution platform 1205. For example, the software, which may correspond to the example computer readable instructions described herein, may be downloaded to the example processor platform(s) 1200 (e.g., example connected edge devices), which are to execute the computer readable instructions 1282 to implement the technique. In some examples, one or more servers of the software distribution platform 1205 are communicatively connected to one or more security domains or security devices through which requests and transmissions of the example computer readable instructions 1282 must pass. In some examples, one or more servers of the software distribution platform 1205 periodically offer, transmit, or force updates to the software (e.g., the example computer readable instructions 1282 of FIG. 12) to ensure improvements, patches, updates, etc. are distributed and applied to the software at the end user devices.

In the illustrated example of FIG. 12, the computer readable instructions 1282 are stored on storage devices of the software distribution platform 1205 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 1282 stored in the software distribution platform 1205 are in a first format when transmitted to the example processor platform(s) 1200. In some examples, the first format is an executable binary in which particular types of the processor platform(s) 1200 can execute. However, in some examples, the first format is uncompiled code that requires one or more preparation tasks to transform the first format to a second format to enable execution on the example processor platform(s) 1200. For instance, the receiving processor platform(s) 1200 may need to compile the computer readable instructions 1282 in the first format to generate executable code in a second format that is capable of being executed on the processor platform(s) 1200. In still other examples, the first format is interpreted code that, upon reaching the processor platform(s) 1200, is interpreted by an interpreter to facilitate execution of instructions.

Figure 13:
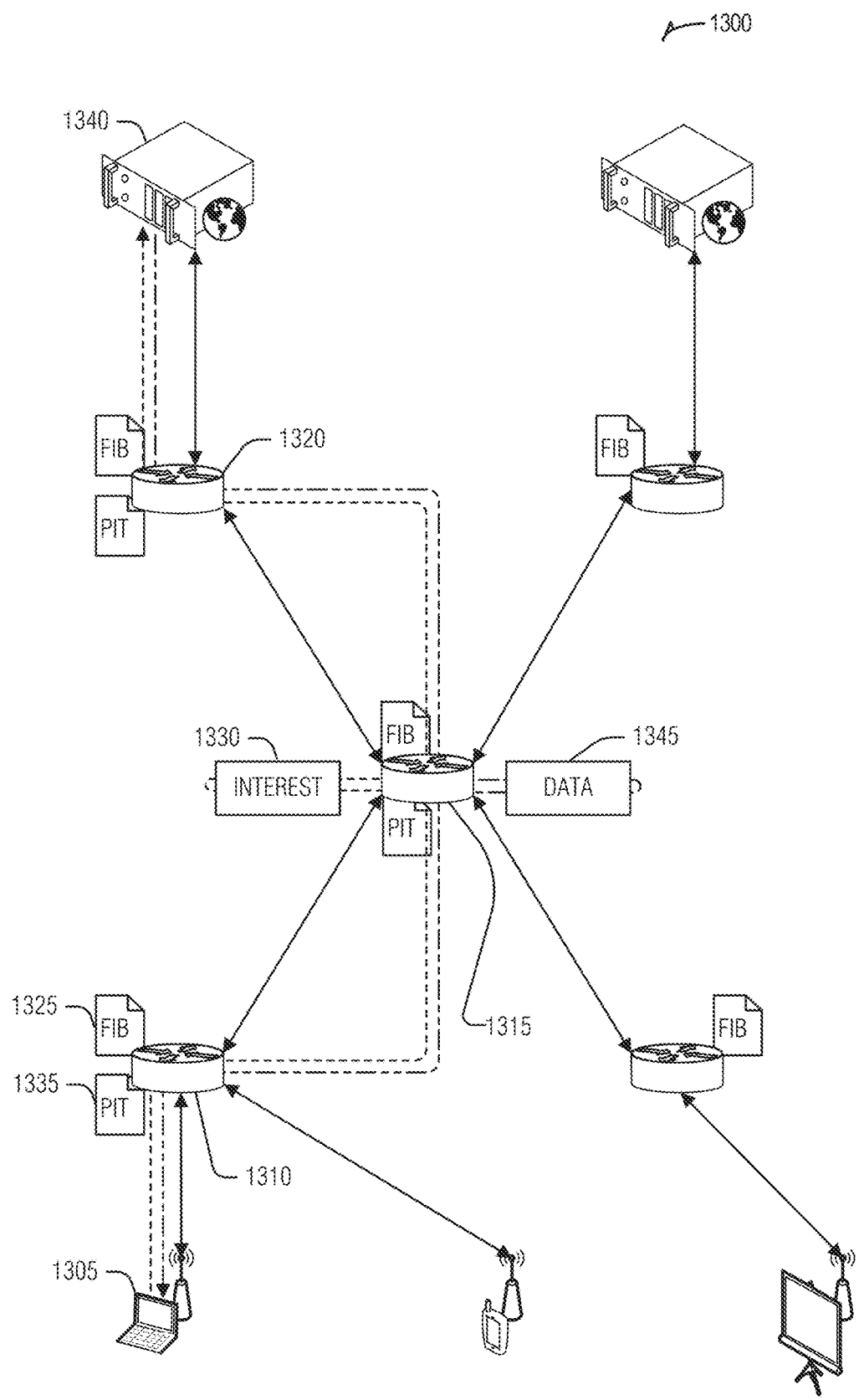
FIG. 13 illustrates an example information centric network (ICN).

FIG. 13 illustrates an example information centric network (ICN), according to an embodiment. ICNs operate differently than traditional host-based (e.g., address-based) communication networks. ICN is an umbrella, term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1305 (e.g., subscriber) requests named content from the network itself. The content request may be called an interest and transmitted via an interest packet 1330. As the interest packet traverses network devices (e.g., network elements, routers, switches, hubs, etc.)—such as network elements 1310, 1315, and 1320 a record of the interest is kept, for example, in a pending interest table (PIT) at each network element. Thus, network element 1310 maintains an entry in its PIT 1335 for the interest packet 1330, network element 1315 maintains the entry in its PIT, and network element 1320 maintains the entry in its PIT.

When a device, such as publisher 1340, that has content matching the name in the interest packet 1330 is encountered, that device 1340 may send a data packet 1345 in response to the interest packet 1330. Typically, the data packet 1345 is tracked back through the network to the source (e.g., device 1305) by following the traces of the interest packet 1330 left in the network element PITs. Thus, the PIT 1335 at each network element establishes a trail back to the subscriber 1305 for the data packet 1345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1330 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1330 to data cached in the ICN element. Thus, for example, if the data 1345 named in the interest 1330 is cached in network element 1315, then the network element 1315 will return the data 1345 to the subscriber 1305 via the network element 1310. However, if the data 1345 is not cached at network element 1315, the network element 1315 routes the interest 1330 on (e.g., to network element 1320). To facilitate routing, the network elements may use a forwarding information base 1325 (FIB) to match named data to an interface (e.g., physical port) for the route. Thus, the FIB 1325 operates much like a routing table on a traditional network device.

In an example, additional meta-data may be attached to the interest packet 1330, the cached data, or the route (e.g., in the FIB 1325), to provide an additional level of matching. For example, the data name may be specified as "www.somedomain.com or videos or v8675309," but also include a version number—or timestamp, time range, endorsement, etc. In this example, the interest packet 1330 may specify the desired name, the version number, or the version range. The matching may then locate routes or cached data matching the name and perform the additional comparison of meta-data or the like to arrive at an ultimate decision as to whether data or a route matches the interest packet 1330 for respectively responding to the interest packet 1330 with the data packet 1345 or forwarding the interest packet 1330.

ICN has advantages over host-based networking because the data segments are individually named. This enables aggressive caching throughout the network as a network element may provide a data packet 1330 in response to an interest 1330 as easily as an original author 1340. Accordingly, it is less likely that the same segment of the network will transmit duplicates of the same data requested by different devices.

Fine grained encryption is another feature of many ICN networks. A typical data packet 1345 includes a name for the data that matches the name in the interest packet 1330. Further, the data packet 1345 includes the requested data and may include additional information to filter similarly named data (e.g., by creation time, expiration time, version, etc.). To address malicious entities providing false information under the same name, the data packet 1345 may also encrypt its contents with a publisher key or provide a cryptographic hash of the data and the name. Thus, knowing the key (e.g., from a certificate of an expected publisher 1340) enables the recipient to ascertain whether the data is from that publisher 1340. This technique also facilitates the aggressive caching of the data packets 1345 throughout the network because each data packet 1345 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (II TF) draft specifications for CCNx 0.x and CCN 1.x, and named data networking (NDN), as specified in the NDN technical report DND-0001.

Figure 14:
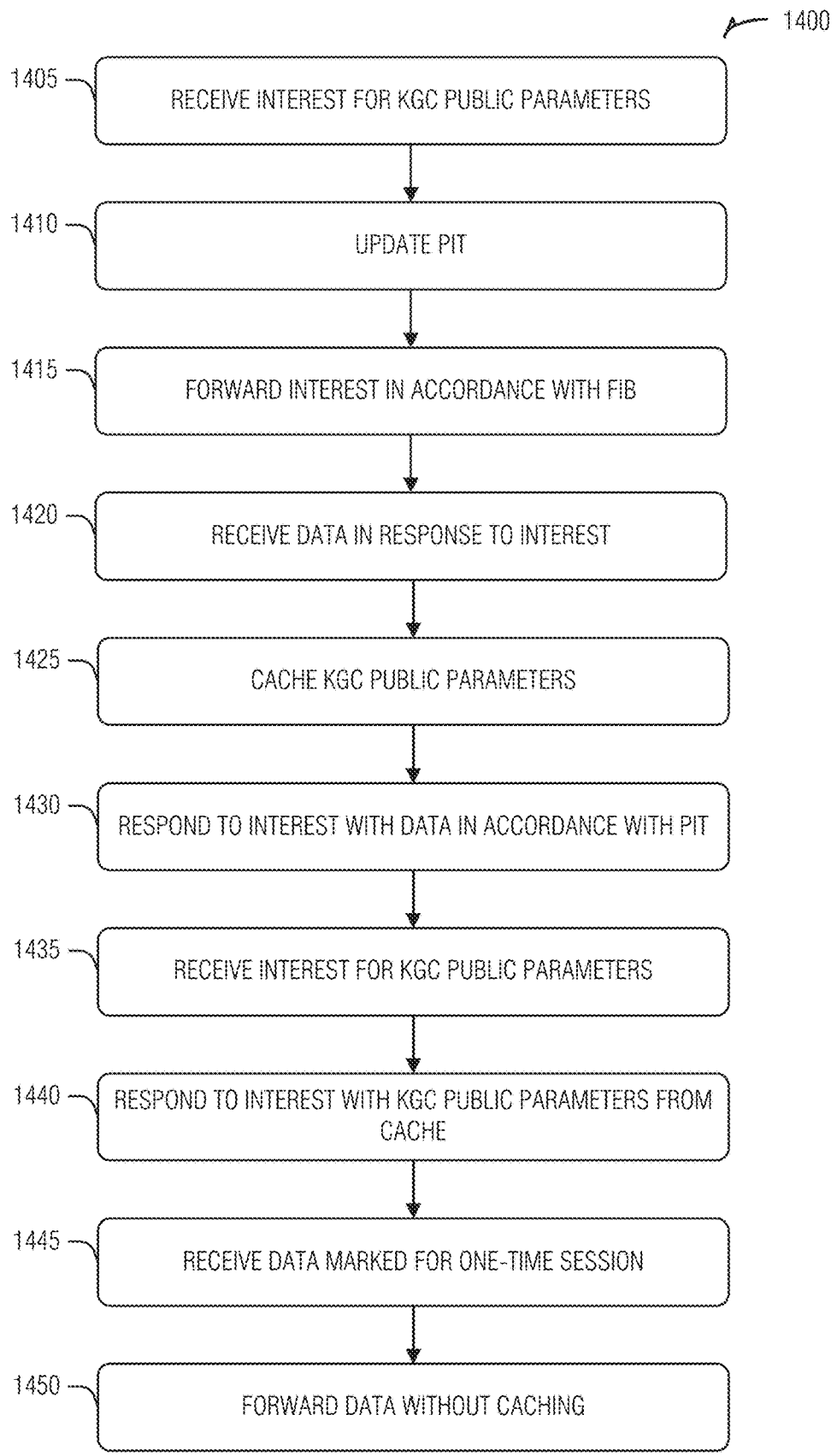
FIG. 14 illustrates a flow diagram of an example of a method for decentralized key generation and management, according to an embodiment.

FIG. 14 illustrates a flow diagram of an example of a method 1400 for decentralized key generation and management, according to an embodiment. The operations of the method 1400 are implement in computational hardware such as that described above or below (e.g., processing circuitry).

At operation 1405*a* first ICN interest packet for public encryption parameters (e.g., public parameters) of an identity based encryption (IBE) key generation center (KGC) is received at an information centric network (ICN) node. Here, the KGC is implemented as a function on an named function network (NFN) node.

At operation 1410, a local pending interest table (PIT) is updated with the ICN interest packet. This enables a data packet sent in response to be sent back out the interface upon which the interest was received.

At operation 1415, the first ICN interest packet is transmitted (e.g., on an outbound interface of the ICN node) based on an entry in a local forwarding information base (FIB).

At operation 1420, a first ICN data packet in response to the first ICN interest packet is received. Here, the first ICN data packet includes the public encryption parameters for the KGC.

At operation 1425, the public encryption parameters are cached. This caching is locally to the ICN node, generally involving storing the public parameters in a local content data store indexed to the name used in the first interest packet to request the parameters.

At operation 1430, the first ICN data packet is transmitted in accordance with the PIT entry for the first ICN interest packet. This enables the requestor to receive the public parameters requested by the first interest packet.

At operation 1435, a second ICN interest packet for the public encryption parameters is received.

At operation 1440, a response to the second ICN interest packet is made with a second ICN data packet that includes the public encryption parameters stored in cache. Here, the KGC public parameters were cached and thus served to the second requestor without contacting the KGC again.

At operation 1445, a third ICN data packet from the KGC is received in response to a key generation request here, the third data packet includes an indication that the third ICN data packet is part of a one-time session. This third ICN data packet is part of a key-generation request to create a secret key for an identity.

At operation 1450, the third ICN data packet is transmitted in accordance with the PIT without caching the third ICN data packet based on the indication that the third ICN data packet is part of the one-time session. In an example, the third ICN data packet includes a generated key for an identity of a requestor to participate in IBE communications. In an example, the generated key is used by the requestor to decrypt communications sent to the requester that are encrypted with the identity and the public encryption parameters. In an example, communications in the one-time session between the requestor and the KGC are encrypted in accordance with the public encryption parameters.

In an example, the KGC is one of a group of cloned KGCs (e.g., KGCaaS instances). Here, each of the cloned KGCs provide the same public encryption parameters and the same generated key for a given input (e.g., identity and random number r). In an example, members of the group of cloned KGCs are distributed to NFN nodes based on node capacity. In an example, the node capacity includes cryptographic hardware to support encryption or key generation. In an example, the node capacity includes hardware that can be securely partitioned. Node capacity generally refers to the suitability of a node to host a KGC. Thus, a host with idle processing power has greater node capacity than another node that is similarly equipped without idle processing power. The distribution of KGCs to nodes is then a function of whether a given node has the hardware and software to support a KGC, and whether the node has power, processing, storage, etc. resources in excess of other capable nodes.

Figure 15:
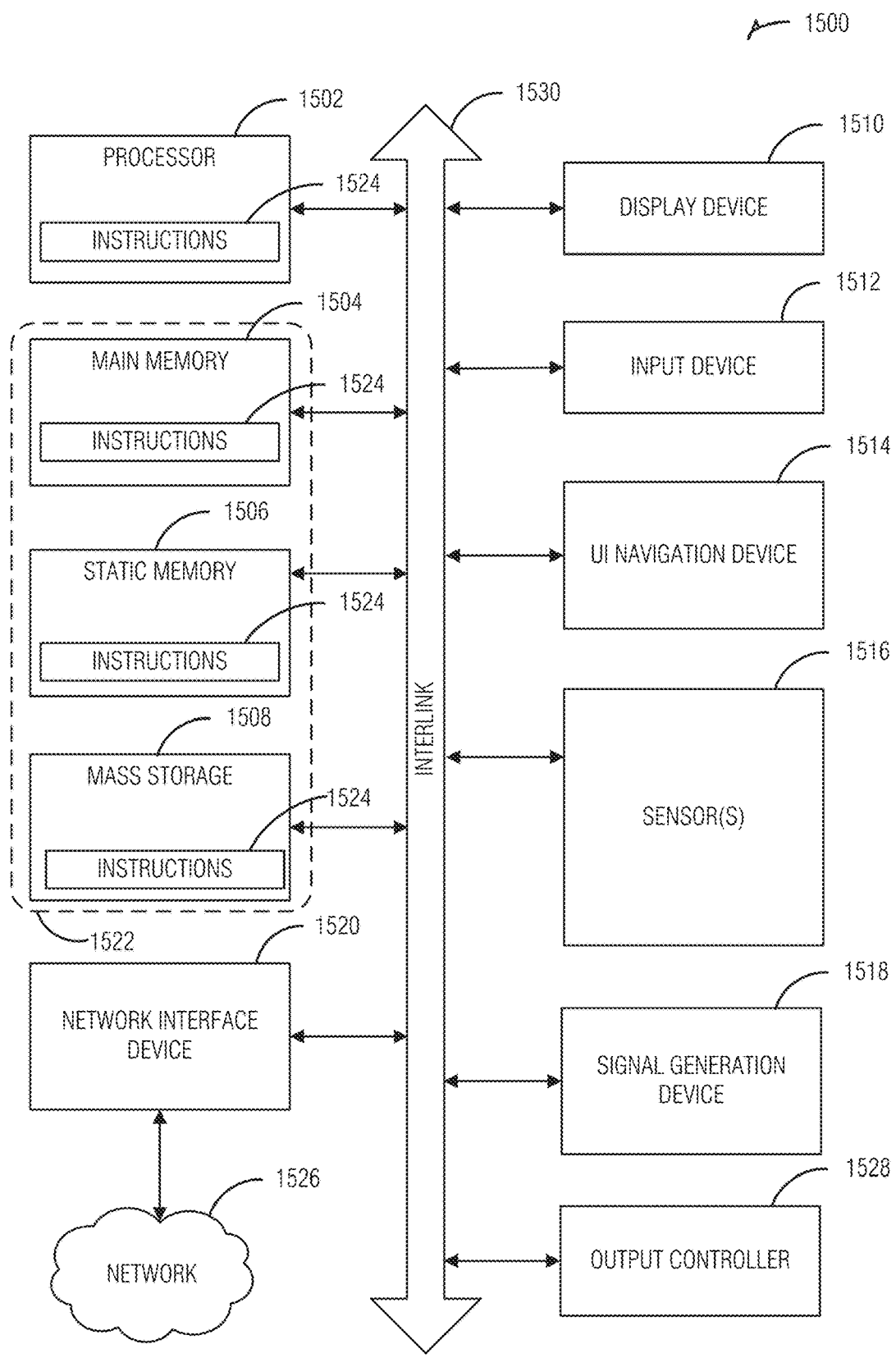
FIG. 15 is a block diagram illustrating an example of a machine upon which one or more embodiments may be implemented.

FIG. 15 illustrates a block diagram of an example machine 1500 upon which any one or more of the techniques (e.g., methodologies) discussed herein may perform. Examples, as described herein, may include, or may operate by, logic or a number of components, or mechanisms in the machine 1500. Circuitry (e.g., processing circuitry) is a collection of circuits implemented in tangible entities of the machine 1500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1500 follow.

In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1500 may include a hardware processor 1502 (e.g., a central processing unit (CPU), a graphics processing unit (GPU), a hardware processor core, or any combination thereof), a main memory. 1504, a static memory (e.g., memory or storage for firmware, microcode, a basic-input-output (BIOS), unified extensible firmware interface (UEFI), etc.) 1506, and mass storage 1508 (e.g., hard drives, tape drives, flash storage, or other block devices) some or all of which may communicate with each other via an interlink (e.g., bus) 1530. The machine 1500 may further include a display unit 1510, an alphanumeric input device 1512 (e.g., a keyboard), and a user interface (UI) navigation device 1514 (e.g., a mouse). In an example, the display unit 1510, input device 1512 and U navigation device 1514 may be a touch screen display. The machine 1500 may additionally include a storage device (e.g., drive unit) 1508, a signal generation device 1518 (e.g., a speaker), a network interface device 1520, and one or more sensors 1516, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1502, the main memory 1504, the static memory 1506, or the mass storage 1508 may be, or include, a machine readable medium 1522 on which is stored one or more sets of data structures or instructions 1524 (e.g., software) embodying or utilized by any one or more of the techniques or functions described herein. The instructions 1524 may also reside, completely or at least partially, within any of registers of the processor 1502, the main memory 1504, the static memory 1506, or the mass storage 1508 during execution thereof by the machine 1500. In an example, one or any combination of the hardware processor 1502, the main memory 1504, the static memory 1506, or the mass storage 1508 may constitute the machine readable media 1522. While the machine readable medium 1522 is illustrated as a single medium, the term "machine readable medium" may include a single medium or multiple media (e.g., a centralized or distributed database, or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1522 may be representative of the instructions 1524, such as instructions 1524 themselves or a format from which the instructions 1524 may be derived. This format from which the instructions 1:524 may be derived may include source code, encoded instructions (e.g., in compressed or encrypted form), packaged instructions (e.g., split into multiple packages), or the like. The information representative of the instructions 1524 in the machine readable medium 1522 may be processed by processing circuitry into the instructions to implement any of the operations discussed herein. For example, deriving the instructions 1524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1524.

In an example, the derivation of the instructions 1524 may include assembly, compilation, or interpretation of the information (e.g., by the processing circuitry) to create the instructions 1524 from some intermediate or preprocessed format provided by the machine readable medium 1522. The information, when provided in multiple parts, may be combined, unpacked, and modified to create the instructions 1524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1524 may be further transmitted or received over a communications network 1526 using a transmission medium via the network interface device 1520 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software. A transmission medium is a machine readable medium.

Additional Notes Examples

Example 1 is an apparatus for encrypting communications, the apparatus comprising: machine readable media including instructions; and processing circuitry that, when in operation, is configured by the instructions to: receive, at an information centric network (ICN) node, a first ICN interest packet for public encryption parameters of an identity based encryption (IBE) key generation center (KGC) implemented as a function on a named function network (NFN) node; update a local pending interest table (PIT) with the ICN interest packet; transmit the first ICN interest packet based on an entry in a local forwarding information base (FIB); receive a first ICN data packet in response to the first ICN interest packet, the first ICN data packet including the public encryption parameters for the KGC; cache the public encryption parameters; transmit the first ICN data packet in accordance with the PIT entry for the first ICN interest packet; receive a second ICN interest packet for the public encryption parameters; respond to the second ICN interest packet with a second ICN data packet that includes the public encryption parameters stored in cache; receive a third ICN data packet from the KGC in response to a key generation request, the third data packet including an indication that the third ICN data packet is part of a one-time session; and transmit the third ICN data packet in accordance with the PIT without caching the third ICN data packet based on the indication that the third ICN data packet is part of the one-time session.

In Example 2, the subject matter of Example 1, wherein the third ICN data packet includes a generated key for an identity of a requestor to participate in IBE communications.

In Example 3, the subject matter of Example 2, wherein the KGC is one of a group of cloned KGCs, each of the cloned KGCs providing the public encryption parameters and a same generated key for a given input.

In Example 4, the subject matter of Example 3, wherein members of the group of cloned KGCs are distributed to NFN nodes based on node capacity.

In Example 5, the subject matter of Example 4, wherein the node capacity includes cryptographic hardware to support encryption or key generation.

In Example 6, the subject matter of any of Examples 4-5, wherein the node capacity includes hardware that can be securely partitioned.

In Example 7, the subject matter of any of Examples 2-6, wherein communications in the one-time session between the requestor and the KGC are encrypted in accordance with the public encryption parameters.

In Example 8, the subject matter of any of Examples 2-7, wherein the generated key is used by the requestor to decrypt communications sent to the requestor that are encrypted with the identity and the public encryption parameters.

Example 9 is a method for encrypting communications, the method comprising: receiving, at an information centric network (ICN) node, a first ICN interest packet for public encryption parameters of an identity based encryption (IBE) key generation center (KGC) implemented as a function on a named function network (NFN) node; updating a local pending interest table (PIT) with the ICN interest packet; transmitting the first ICN interest packet based on an entry in a local forwarding information base (FIB); receiving a first ICN data packet in response to the first ICN interest packet, the first ICN data packet including the public encryption parameters for the KGC; caching the public encryption parameters; transmitting the first ICN data packet in accordance with the PIT entry for the first ICN interest packet; receiving a second ICN interest packet for the public encryption parameters; responding to the second ICN interest packet with a second ICN data packet that includes the public encryption parameters stored in cache; receiving a third ICN data packet from the KGC in response to a key generation request, the third data packet including an indication that the third ICN data packet is part of a one-time session; and transmitting the third ICN data packet in accordance with the PIT without caching the third ICN data packet based on the indication that the third ICN data packet is part of the one-time session.

In Example 10, the subject matter of Example 9, wherein the third ICN data packet includes a generated key for an identity of a requestor to participate in IBE communications.

In Example 11, the subject matter of Example 10, wherein the KGC is one of a group of cloned KGCs, each of the cloned KGCs providing the public encryption parameters and a same generated key for a given input.

In Example 12, the subject matter of Example 11, wherein members of the group of cloned KGCs are distributed to NFN nodes based on node capacity.

In Example 13, the subject matter of Example 12, wherein the node capacity includes cryptographic hardware to support encryption or key generation.

In Example 14, the subject matter of any of Examples 12-13, wherein the node capacity includes hardware that can be securely partitioned.

In Example 15, the subject matter of any of Examples 10-14, wherein communications in the one-time session between the requestor and the KGC are encrypted in accordance with the public encryption parameters.

In Example 16, the subject matter of any of Examples 10-15, wherein the generated key is used by the requestor to decrypt communications sent to the requestor that are encrypted with the identity and the public encryption parameters.

Example 17 is at least one machine readable medium including instructions for encrypting communications, the instructions, when executed by processing circuitry, cause the processing circuitry to perform operations comprising: receiving, at an information centric network (ICN) node, a first ICN interest packet for public encryption parameters of an identity based encryption (IBE) key generation center (KGC) implemented as a function on a named function network (NFN) node; updating a local pending interest table (PIT) with the ICN interest packet; transmitting the first ICN interest packet based on an entry in a local forwarding information base (FIB); receiving a first ICN data packet in response to the first ICN interest packet, the first ICN data packet including the public encryption parameters for the KGC; caching the public encryption parameters; transmitting the first ICN data packet in accordance with the PIT entry for the first ICN interest packet; receiving a second ICN interest packet for the public encryption parameters; responding to to second ICN interest packet with a second ICN data packet that includes the public encryption parameters stored in cache; receiving a third ICN data packet from the KGC in response to a key generation request, the third data packet including an indication that the third ICN data packet is part of a one-time session; and transmitting the third ICN data packet in accordance with the PIT without caching the third ICN data packet based on the indication that the third ICN data packet is part of the one-time session.

In Example 18, the subject matter of Example 17, wherein the third ICN data packet includes a generated key for an identity of a requestor to participate in IBE communications.

In Example 19, the subject matter of Example 18, wherein the KGC is one of a group of cloned KGCs, each of the cloned KGCs providing the public encryption parameters and a same generated key for a given input.

In Example 20, the subject matter of Example 19, wherein members of the group of cloned KGCs are distributed to NFN nodes based on node capacity.

In Example 21, the subject matter of Example 20, wherein the node capacity includes cryptographic hardware to support encryption or key generation.

In Example 22, the subject matter of any of Examples 20-21, wherein the node capacity includes hardware that can be securely partitioned.

In Example 23, the subject matter of any of Examples 18-22, wherein communications in the one-time session between the requestor and the KGC are encrypted in accordance with the public encryption parameters.

In Example 24, the subject matter of any of Examples 18-23, wherein the generated key is used by the requestor to decrypt communications sent to the requestor that are encrypted with the identity and the public encryption parameters.

Example 25 is a system for encrypting communications, the system comprising: means for receiving, at an information centric network (ICN) node, a first ICN interest packet for public encryption parameters of an identity based encryption (IBE) key generation center (KGC) implemented as a function on a named function network (NFN) node; means for updating a local pending interest table (PIT) with the ICN interest packet; means for transmitting the first ICN interest packet based on an entry in a local forwarding information base (FIB); means for receiving a first ICN data packet in response to the first ICN interest packet, the first ICN data packet including the public encryption parameters for the KGC; means for caching the public encryption parameters; means for transmitting the first ICN data packet in accordance with the PIT entry for the first ICN interest packet; means for receiving a second ICN interest packet for the public encryption parameters; means for responding to the second ICN interest packet with a second ICN data packet that includes the public encryption parameters stored in cache; means for receiving a third ICN data packet from the KGC in response to a key generation request, the third data packet including an indication that the third ICN data packet is part of a one-time session; and means for transmitting the third ICN data packet in accordance with the PIT without caching the third ICN data packet based on the indication that the third ICN data packet is part of the one-time session.

In Example 26, the subject matter of Example 25, wherein the third ICN data packet includes a generated key for an identity of a requestor to participate in IBE communications.

In Example 27, the subject matter of Example 26, wherein the KGC is one of a group of cloned KGCs, each of the cloned KGCs providing the public encryption parameters and a same generated key for a given input.

In Example 28, the subject matter of Example 27, wherein members of the group of cloned KGCs are distributed to NFN nodes based on node capacity.

In Example 29, the subject matter of Example 28, wherein the node capacity includes cryptographic hardware to support encryption or key generation.

In Example 30, the subject matter of any of Examples 28-29, wherein the node capacity includes hardware that can be securely partitioned.

In Example 31, the subject matter of any of Examples 26-30, wherein communications in the one-time session between the requestor and the KGC are encrypted in accordance with the public encryption parameters.

In Example 32, the subject matter of any of Examples 26-31, wherein the generated key is used by the requestor to decrypt communications sent to the requestor that are encrypted with the identity and the public encryption parameters.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for encrypting communications, the apparatus comprising:
    machine readable media including instructions; and
    processing circuitry that, when in operation, is configured by the instructions to:
        receive, at an information centric network (ICN) node, a first ICN interest packet for public encryption parameters of an identity based encryption (IBE) key generation center (KGC) implemented as a function on a named function network (NFN) node;
        update a local pending interest table (PIT) with the first ICN interest packet;
        transmit the first ICN interest packet based on an entry in a local forwarding information base (FIB);
        receive a first ICN data packet in response to the first ICN interest packet, the first ICN data packet including the public encryption parameters for the KGC;
        cache the public encryption parameters;
        transmit the first ICN data packet in accordance with an entry in the PIT for the first ICN interest packet;
        receive a second ICN interest packet for the public encryption parameters;
        respond to the second ICN interest packet with a second ICN data packet that includes the public encryption parameters stored in cache;
        receive a third ICN data packet from the KGC in response to a key generation request, the third ICN data packet including an indication that the third ICN data packet is part of a one-time session, wherein the KGC is one of a group of cloned KGCs, and wherein KGCs in the group of cloned KGCs provide the public encryption parameters and a same generated key for a given input; and
        transmit the third ICN data packet in accordance with the PIT without caching the third ICN data packet based on the indication that the third ICN data packet is part of the one-time session.

2. The apparatus of claim 1, wherein the third ICN data packet includes a generated key for an identity of a requestor to participate in IBE communications.

3. The apparatus of claim 1, wherein members of the group of cloned KGCs are distributed to NFN nodes based on node capacity.

4. The apparatus of claim 3, wherein the node capacity includes cryptographic hardware to support encryption or key generation.

5. The apparatus of claim 3, wherein the node capacity includes hardware that can be securely partitioned.

6. The apparatus of claim 2, wherein communications in the one-time session between the requestor and the KGC are encrypted in accordance with the public encryption parameters.

7. The apparatus of claim 2, wherein the generated key is used by the requestor to decrypt communications sent to the requestor that are encrypted with the identity and the public encryption parameters.

8. A method for encrypting communications, the method comprising:
    receiving, at an information centric network (ICN) node, a first ICN interest packet for public encryption parameters of an identity based encryption (IBE) key generation center (KGC);

receiving public encryption parameters for the KGC in a first ICN data packet in response to the first ICN interest packet;

caching the public encryption parameters;

responding to a second ICN interest packet for the public encryption parameters with a second ICN data packet that includes the public encryption parameters stored in cache;

receiving a third ICN data packet from the KGC in response to a key generation request, the third ICN data packet including an indication that the third ICN data packet is part of a one-time session, wherein the KGC is one of a group of cloned KGCs, and wherein KGCs in the group of cloned KGCs provide the public encryption parameters and a same generated key for a given input; and transmitting the third ICN data packet without caching the third ICN data packet based on the indication.

9. The method of claim 8, wherein the third ICN data packet includes a generated key for an identity of a requestor to participate in IBE communications.

10. The method of claim 8, wherein members of the group of cloned KGCs are distributed to NFN nodes based on node capacity.

11. The method of claim 10, wherein the node capacity includes cryptographic hardware to support encryption or key generation.

12. The method of claim 10, wherein the node capacity includes hardware that can be securely partitioned.

13. The method of claim 9, wherein communications in the one-time session between the requestor and the KGC are encrypted in accordance with the public encryption parameters.

14. The method of claim 9, wherein the generated key is used by the requestor to decrypt communications sent to the requestor that are encrypted with the identity and the public encryption parameters.

15. At least one non-transitory machine readable medium including instructions for encrypting communications, the instructions, when executed by processing circuitry, cause the processing circuitry to perform operations comprising:

receiving, at an information centric network (ICN) node, a first ICN interest packet for public encryption parameters of an identity based encryption (IBE) key generation center (KGC) implemented as a function on a named function network (NFN) node;

updating a local pending interest table (PIT) with the first ICN interest packet;

transmitting the first ICN interest packet based on an entry in a local forwarding information base (FIB);

receiving a first ICN data packet in response to the first ICN interest packet, the first ICN data packet including the public encryption parameters for the KGC;

caching the public encryption parameters;

transmitting the first ICN data packet in accordance with an entry in the PIT entry for the first ICN interest packet;

receiving a second ICN interest packet for the public encryption parameters;

responding to the second ICN interest packet with a second ICN data packet that includes the public encryption parameters stored in cache;

receiving a third ICN data packet from the KGC in response to a key generation request, the third ICN data packet including an indication that the third ICN data packet is part of a one-time session, wherein the KGC is one of a group of cloned KGCs, and wherein KGCs in the group of cloned KGCs provide the public encryption parameters and a same generated key for a given input; and transmitting the third ICN data packet in accordance with the PIT without caching the third ICN data packet based on the indication that the third ICN data packet is part of the one-time session.

16. The at least one non-transitory machine readable medium of claim 15, wherein the third ICN data packet includes a generated key for an identity of a requestor to participate in IBE communications.

17. The at least one non-transitory machine readable medium of claim 15, wherein members of the group of cloned KGCs are distributed to NFN nodes based on node capacity.

18. The at least one non-transitory machine readable medium of claim 17, wherein the node capacity includes cryptographic hardware to support encryption or key generation.

19. The at least one non-transitory machine readable medium of claim 17, wherein the node capacity includes hardware that can be securely partitioned.

20. The at least one non-transitory machine readable medium of claim 16, wherein communications in the one-time session between the requestor and the KGC are encrypted in accordance with the public encryption parameters.

21. The at least one non-transitory machine readable medium of claim 16, wherein the generated key is used by the requestor to decrypt communications sent to the requestor that are encrypted with the identity and the public encryption parameters.

* * * * *